United States Patent [19]

Maldacker

[11] 4,141,157
[45] Feb. 27, 1979

[54] PORTABLE TEACHING DEVICE REPRESENTING THE SKY WITH THE STARS

[76] Inventor: Anthony A. Maldacker, 2696 Lakeshore Blvd. W., Apt. 24, Toronto, Ontario, Canada, M8V 1G8

[21] Appl. No.: 804,058

[22] Filed: Jun. 6, 1977

[51] Int. Cl.² ............................................. G09B 27/06
[52] U.S. Cl. ............................................................. 35/47
[58] Field of Search ............ 35/47, 46 R, 46 A, 42.5, 35/43

[56] References Cited

U.S. PATENT DOCUMENTS

| 501,136 | 7/1893 | Gregory | 35/47 |
|---|---|---|---|
| 949,348 | 2/1910 | Baker | 35/43 |
| 1,928,025 | 9/1933 | McEwan | 35/47 |
| 2,358,075 | 9/1944 | Kissinger | 35/47 |
| 2,372,487 | 3/1945 | Hagner | 35/43 |
| 2,402,194 | 6/1946 | Wolfe | 35/43 |
| 2,763,183 | 9/1956 | Liversidge | 35/43 X |

*Primary Examiner*—William H. Grieb

[57] ABSTRACT

The invention relates to a portable celestial globe called Kozmosphere, consisting of a sphere the inside of which represents the sky with the stars and the Milky Way, observed through strategically distributed peepholes, and the outside of the sphere featuring either the stars as those inside, but completed with additional astronomical data, or else, featuring the map of the Earth or that of the Moon.

To the south pole of the sphere is fastened a flashlight the bulb of which protrudes into the sphere illuminating it when switched on. The flashlight serves also as the handle of the Kozmosphere. When not used, it can be put into a vase, thus being a nice decor of the home.

The Kozmopshere can be made in three basic forms:

1. The stars represented by tiny holes on a sheet, fixed to the inner side of a transparent sphere which can be illuminated from outside, and the Milky Way painted inside with a luminescent paint and activated by the inner flashlight.
2. A non-transparent sphere with the same features on both sides of the sphere, as in 1.
3. A sphere as in 2, but the sky with the stars and Milky Way printed or painted only on the inner side of the sphere, the outer side featuring either the map of the Earth or that of the Moon.

12 Claims, 1 Drawing Figure

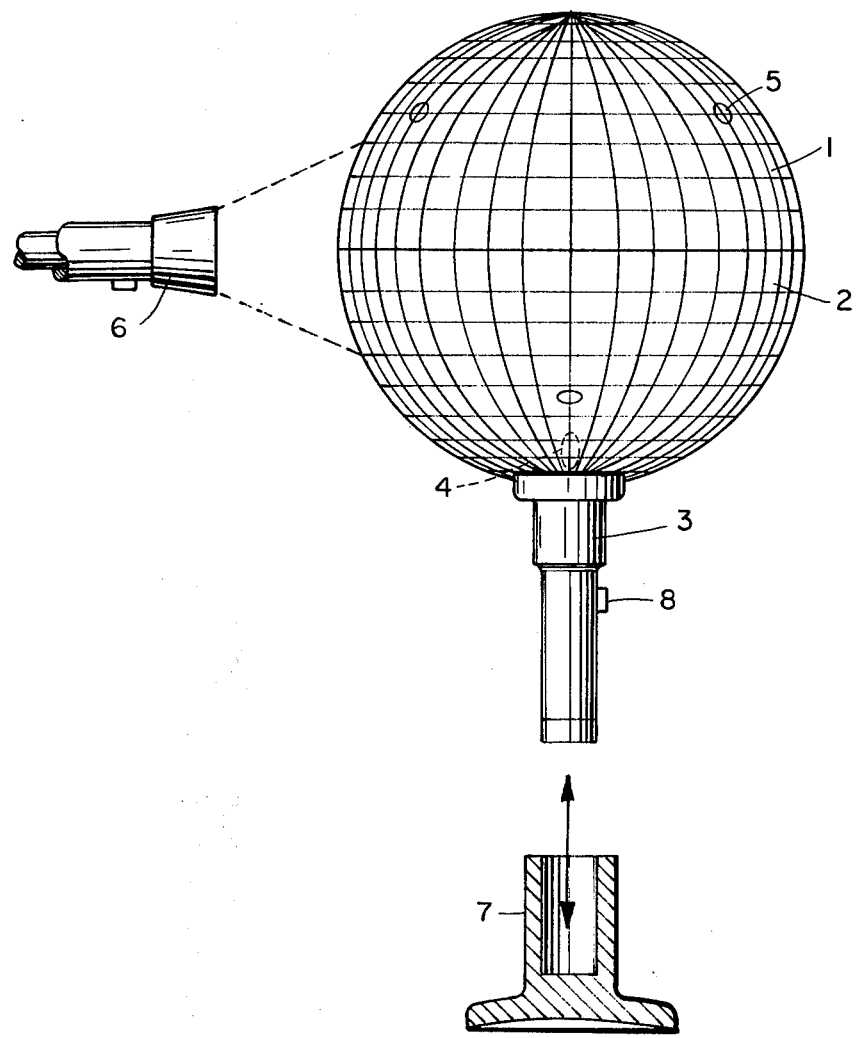

PORTABLE TEACHING DEVICE REPRESENTING THE SKY WITH THE STARS

This invention relates to a portable celestial globe which I will call in the following disclosure a "Kozmosphere".

In our age of space exploration increasing interest in astronomy can be seen all over the world. As a result, a rapidly growing number of books and maps are published about it. Regarding maps, however, the increase is mainly quantitative.

Improvement in quality is restricted by the fact that, although the heavenly bodies are seen as if located on a celestial sphere, the chart of them is in most cases on sheets. The drawback of these maps is the same as that of the geographical maps — they distort the true picture, since it is impossible to unfold the surface of a sphere on a plane without altering the relative position of its parts to each other. The cartographer has to compromise by either applying some form of projection or — figuratively speaking — cutting up the wall of the sphere into slices, thus lessening the distortion. In both cases, however, some distortion remains.

Depicting the Earth, the Moon or the Celestial Globe without said imperfection can be arrived at only on spheres, and as a matter of fact, this method is used with globes bearing the map of the Earth, the Moon or the sky with the stars. The globe of the Earth, and of the Moon show the surface features of them in the same fashion as they are seen in nature, namely from the outside. On the globes representing the sky, however, the signs of the heavenly bodies are seen as from the outside of the imagined sphere of the sky whereas, in fact, we see the real sky from inside.

The object of my invention is to eliminate the above mentioned drawbacks and shortcomings, and to present an apparatus which shows the sky as it really appears to the sky-gazer at night.

The invention may be carried out into practice in a number of ways, and some specific embodiments will now be described by way of examples, with reference to the accompanying drawing. Sizes and shapes in the drawing are merely illustrative of one or more possible patterns and not restrictive of the present inventive concept. In short: the invention is illustrated by, but not limited to the following examples.

In the drawing which illustrates embodiment of the invention, in FIG. 1 reference numeral 1 denotes the Northern Hemisphere representing the sky, and reference numeral 2 denotes the Southern Hemisphere, connected together.

Flashlight 3 is attached to the lower hemisphere, in this case to the southern one. Bulb 4 protrudes into the sphere. Reference numerals 5 represent the peepholes. There are at least four, preferably six of them through which the inner surface of the sphere can be observed. Flashlight 3 sinks into handle 6 the lower part of which is the footing 7 of the Kozmosphere. Button 8 of the flashlight protrudes through a slit on the upper side of the handle. 3 intrudes into the inner space of the sphere to illuminate it when switched on, to see the coordinate system, the inscriptions, the connecting lines of the constellations etc. Flashlight 3 serves also to energize the picture of the Milky Way painted with a luminous paint, either of the luminescent or phosphorescent variety. It energizes also the pictures of the stars if they are shown as luminous dots painted on the inside wall.

Actual production of the Kozmosphere can be made in different ways, some of which are describes as follows:

Into a transparent sphere there are pasted sheets of some flexible material, e.g. paper with the representation of the stars through tiny holes, the diameters of which are in approximate relation to the visual brightness of the proper stars on the sky. The relevant astronomical data are distributed on the two sides of the sheets in such a way that the inner side of the sphere would enhance the illusion of seeing the real sky, with the stars brightened by lamp 6 from outside, and the Milky Way shining when illuminated by flashlight 3. The inner printing exhibits some of written information, such as the designations of the celestial coordinates, the names of the brightest stars etc. The outer sides of the sheets show, besides the holes representing the stars, also the man-made data, the names of the stars, those of the constellations, the internationally accepted boundaries of the constellations.

Another type would be the Kozmosphere which is made of non-transparent material equipped with the same data and in the same distribution as in the transparent sphere and the stars represented as mentioned above.

Both main types — that with the transparent sphere and pasted-in paper sheet, as well as the other one of a non-transparent body with pasted-on sheet on the inner and outer surface respectively — encompass also alternative forms in which all data concerning the stars are concentrated on the inner side of the Kozmosphere, whereas the outer side exhibits the map of the Earth and that of the Moon respectively. These cases apply, however, only to the Kozmospheres with printed or painted stars.

The embodiments of the invention in which an exclusive property is claimed are defined as follows:

1. A hollow sphere and a stem attached to it, the sphere made of transparent material comprising two halves, representing the Northern and Southern hemispheres of the sky, on the inner surface of the sphere is pasted some flexible, non-transparent sheet, like paper; on both sides of said sheet being shown celestial objects and related data of them, the inner side of said sphere being seen when looking through properly distributed peepholes on the sphere the diameter of which peepholes being about ½", to enable the viewer to see a substantial part of the opposite inside surface of the sphere which can be illuminated by a flashlight the bulb of which protrudes into the sphere; the stem serving as the handle of the sphere and its lower part serving as the stand of the apparatus.

2. A hollow sphere as described in claim 1, in which the stars are represented by tiny holes the diameters of which holes are proportional to the brightness of the represented stars, and illuminated from outside by a flashlight.

3. A hollow sphere as represented in claim 1 in which the stars are shown on both sides of the pasted-in sheets by printed dots.

4. A hollow sphere as represented in claim 1, in which the stars are shown by painted, luminescent dots.

5. A hollow sphere as represented in claim 1, in which the stars and all the relevant data are printed on the inner surface, whereas the outer surface features the map of the Earth.

6. A hollow sphere as represented in claim 1, the outer surface featuring the map of the Moon.

7. A hollow sphere and a stem attached to it, the sphere made of non-transparent material comprising two halves representing the Northern and Southern Hemispheres on which the celestial bodies and the related data are exhibited, the inner side of said sphere seen through strategically distributed peepholes on the sphere, said peepholes being about ½" diameter to enable the viewer to see a substantial part of the opposite inside surface of the sphere, the stem being a flashlight also serving as handle of the sphere, the bulb of the flashlight intruding into the sphere.

8. A hollow sphere as described in claim 7, in which the stars are represented by tiny holes the diameters of which are proportional to the brightness of the represented stars, and illuminated from outside by a flashlight.

9. A hollow sphere as described in claim 7, in which the stars are represented on both side of the sphere by printed dots.

10. A hollow sphere as described in claim 7, in which the stars are represented by painted, luminescent dots.

11. A hollow sphere as described in claim 7, in which the inner side exhibits the stars and all the relevant data, and the outer side features the map of the Earth.

12. A hollow sphere as described in claim 7, in which the outer side features the map of the Moon.

* * * * *